Aug. 5, 1952 A. R. WELCH 2,606,138
METHOD OF MAKING PLYWOOD HAVING AN OVERLAY THEREON
Filed Nov. 4, 1946
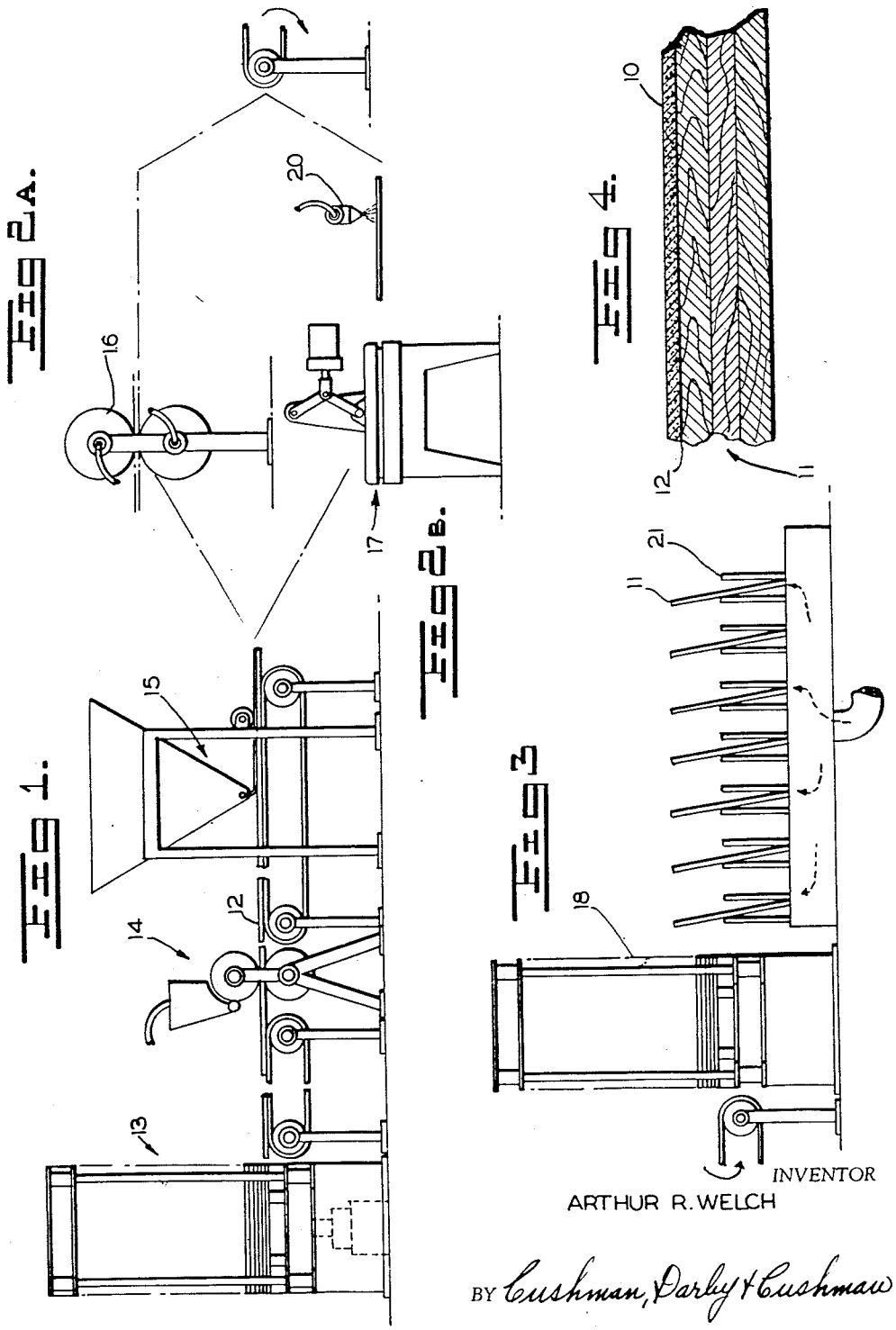
INVENTOR
ARTHUR R. WELCH
BY Cushman, Darby & Cushman
ATTORNEY Patented Aug. 5, 1952

2,606,138

UNITED STATES PATENT OFFICE 2,606,138

METHOD OF MAKING PLYWOOD HAVING AN OVERLAY THEREON

Arthur R. Welch, Aberdeen, Wash.

Application November 4, 1946, Serial No. 707,767

11 Claims. (Cl. 154—133)

1

The present invention relates to a new and improved method of making a composite wood product, such as a plywood panel or the like having a coating or covering, known in the trade as an "overlay," of novel characteristics associated therewith, and to the resulting product.

The invention constitutes improvements upon my prior applications Serial Nos. 548,773 filed August 9, 1944 (now Patent 2,419,614, April 29, 1947) and 548,774, filed August 9, 1944, now Patent No. 2,601,349, both as to procedures discovered in the manufacture of the new product and in the product itself.

An important object of the invention is to improve and simplify the method of making a wood product having an overlay bonded to one or both of its surfaces.

An equally important object is to produce a product, such as a plywood panel, provided with an overlay, having improved structural characteristics.

Another object of the invention is to so treat the panel, prior to the reception of the overlay material, that an improved bond between the panel and the overlay is produced and without damage to the overlay.

Another object of the invention is to treat the overlay material, after its application to the panel, in a new and improved manner, facilitating subsequent handling of the panel prior to the final consolidation of the overlay with the panel.

Another object is to provide a method of treating the overlay, just prior to final pressing, so as to produce an improved surface condition on the overlay, after final pressing.

Another object is to provide a method of final pressing which entirely eliminates any danger of disrupting the surface of the overlay by the violent escape of steam or other highly heated gases, formed during the final pressing operation.

Other and further objects and advantages of the invention will be apparent from the following description of an illustrative embodiment of the new method.

In making the new product, I preferably use the overlay material described and claimed in my copending application entitled "Method of Making Synthetic Resin and Plywood Overlay Material, and Resulting Product," Ser. No. 707,766 filed concurrently herewith, now abandoned, and reference is made to that application for a complete disclosure of the synthetic resin, its method of manufacture, and the method of combining

2 the same with discrete wood particles and other ingredients to produce the overlay material embodied in the inventions herein.

Briefly, the resin product of said copending application consists of the reaction product of equal volumes of phenol and a 37% aqueous solution of formaldehyde with a catalyst consisting of .5% caustic soda in solution. The materials are heated only sufficiently high to initiate the reaction, and the application of heat is then immediately discontinued. The reaction continues under the exothermic heat of the reaction alone until all bubbling stops, substantially 40 minutes after the initiation of the reaction, at which time the mixture is positively cooled to a temperature sufficiently low to terminate the reaction. The aqueous resin solution so produced may be used immediately or stored for mixing with the wood particles at substantially subsequent times.

Preferably finely powdered chlorinated paraffin is added to the resin in an amount equal to 1½% of the weight of the liquid resin, just before the latter is mixed with the wood particles. Also, preferably, a fire retardant, as fire clay in an amount equal to 5% of the weight of the resin and wood, is added during the mixing of the latter. A suitable proportion of wood and resin is 60 pounds of wood to 21 pounds of liquid resin, but the invention, of course, is not limited to this proportion. However, the wood in all cases is the major constituent of the mixture.

Certain novel procedures have been devised in the manufacture of the final wood products, particularly in treating the panels, applying the overlay material thereto and in coating the overlay prior to hot pressing.

In the accompanying drawings, certain preferred methods are illustrated diagrammatically.

Figure 1 is a diagrammatic representation of the first two steps in the method;

Figures 2a and 2b illustrate alternative procedures of applying preliminary compression to the overlay material, following the steps of Figure 1;

Figure 3 shows, diagrammatically, the final pressing and conditioning steps;

Figure 4 is a sectional view of the completed product, similar to Figure 4 of my patent No. 2,419,614.

I have discovered that the final bond between the overlay material 10 and the panel 11 is greatly improved by preliminarily applying to the panel, a coat of synthetic resin 12 similar to or compatible with the resin used as the binder for the overlay. Preferably, the panels, non-sanded and while they still retain substantial amounts of heat obtained from the hot press 13, are run through a standard glue spreader 14, which applies a very thin even coat of synthetic resin to the surface or surfaces which are to receive the overlay material. The glue spreader should be adjusted to apply as thin a coat of resin as is practical. When applying glue to the core plies in the manufacture of plywood panels, in accordance with conventional practice, substantially 25 lbs. of synthetic resin glue per thousand square feet of glue line are employed. In accordance with the present invention, however, a minimum of 5 or 10 lbs. of resin per thousand feet of panel surface need be applied and any excess thereover is wasteful of resin.

Although the same resin as is used as the binder in the overlay mixture may be employed for my purposes, a resin which sets at a lower temperature and in a shorter time than the special resin described above is preferred. Such a resin may be produced by any of the procedures known to the art, for instance, by increasing the strength or amount of the catalyst, by adjusting the various ingredients or by carrying the reaction farther. Hence, it will be completely converted in the hot press by the time that the resin in the overlay has been converted, in spite of the fact that it is farther away from the heated press platens than the overlay and is heated only by conduction through the overlay and through the adjacent panel. Thus the processing of the overlay and the processing of the bond between the overlay and the panel can be completed at substantially the same time and with uniform results. Also, the application of a resin coating on the panel before the application of the overlay mixture provides for resisting the passage of moisture into the panel. Dry panels tend to produce problems incident to the presence of steam in the final pressing operation.

The application of the resin coat to the panels, while they still retain most of the heat received during hot pressing, as substantially immediately after they are removed from the hot press and before they have cooled, is advantageous, since the heat of the panels serves to evaporate the moisture from the resin coat and gives them a substantially dry feel, although it does not convert or set up the resin. This provides for an in-line production. Also, if the panels are immediately stacked after removal from the hot press, they will retain sufficient heat for substantial periods to dry the resin. When the panels are so coated with a dry and water-resistant coating, they may be handled, stacked and stored indefinitely, prior to the application of the overlay material.

The layer of the mixture of sawdust, sanderdust or other discrete wood particles and synthetic resin and the other ingredients referred to above is preferably applied to the panels in accordance with the method and by the machinery described in my prior application, Serial No. 548,774, filed August 9, 1944, as modified by my concurrently filed application, Serial No. 707,766, now abandoned, if desired. Apparatus for applying the smooth, even layer of overlay material is diagrammatically represented at 15 in Figure 1. Thus, the mixture is accurately spread to provide an accurately controlled total thickness of the panel and the overlay mixture and is spread upon the upper surface of a resin coated, non-sanded panel, as the same is moved.

The layer of the mixture may be given a preliminary compression, by means of a large heated roll as diagrammatically represenated at 16 in Figure 2a, or a heated platen press shown diagrammatically at 17 in Figure 2b, or both. Such a preliminary compression is highly desirable, since it greatly facilitates subsequent handling of the panels and the loading of the panels into the hot press 18. When given a preliminary compression, as described in the last mentioned application, the layer of aggregate is quite firmly matted and sufficiently consolidated so that it will not readily become ruptured or dislodged. In fact, the panels may be stacked and be carted about the plant and placed in the press loader and inserted into the press openings without disturbing the layer of overlay material. Without such a preliminary compression, the panels have to be quite carefully handled, as the layer of mixture is relatively loose, light, dry and fluffy, and is likely to be disturbed when the panels are manipulated.

When employing a steam heated platen press 17 at a temperature of from 250 to 300° F., entirely satisfactory results in the preliminary compression step are accomplished, if the panels are subjected to pressure for periods of from 5 to 10 seconds. If the temperature of the press is low, the time should be higher, and vice versa. For instance, at 250° F. and a ten second pressing time, satisfactory results are obtained, but at the end of only five seconds, the overlay material was not sufficiently compacted, but was soft. At 270° to 300° temperature, five seconds is sufficient to produce the desired results. A platen pressure of 30 lbs. per square inch is satisfactory, with these times and temperatures. If the pressure is increased, the time and temperature may be decreased. Care, of course, must be taken to refrain from heating the mixture to a point sufficiently high to convert or set up the synthetic resin during the preliminary pressing step.

As stated above, after the preliminary compression, the panels may be stacked or otherwise handled prior to final pressing.

The panels, with the preliminarily compressed layers of overlay material on their surfaces may be loaded into a hot press 18 of the type commonly employed in consolidating the various plies of plywood panels, and subjected to heat and pressure to compact the overlay material and to convert or set up the resin to the final substantially insoluble, infusible stage, in which condition the resin binds the wood particles to each other and the layer as a whole to the surface of the panel.

As stated above, chlorinated paraffin, in an amount equal to substantially 1½ of the weight of the liquid resin, may be added to the resin prior to the mixing of the resin with the wood particles. One theory of the phenomena occurring is that the wax, in the form of a fine white powder, is not absorbed by the wood particles during the mixing with the resin, whereas, the aqueous resin solution has marked affinity for the wood particles and is absorbed thereby and thus, the wax remains in the mixture as discrete minute particles.

Apparently, the wax has greater affinity for the heated steel platen of the hot press than does the resin, and seems to be drawn by the heated platen to the surface thereof with the result that it effectively wets the metal and prevents the resin and wood particles from sticking to the plate. Thus, the wax acts as a lubricant for the press platen and entirely eliminates all sticking and plate fouling problems. Also, the plates of the hot press may be treated with lubricants capable of withstanding press plate temperatures to prevent sticking or fouling problems.

If a highly finished, hard, glossy surface is desired on the overlay in the finished product, I have discovered that this result may be accomplished by applying to the upper surface of the preliminarily compressed overlay as indicated at 20 in Figure 2b, a thin coating of the same synthetic resin as is employed as the binder in the overlay mixture. In some cases, the resin is mixed with an equal volume of water and sprayed at the rate of 10 lbs of resin per 1,000 square feet of overlay surface. In other cases, where a higher surface resin content is desired, the resin may be used without dilution and sprayed at the rate of 15 or more lbs. of resin per thousand feet.

As a result of this procedure, and others herein described, the overlay has a relatively high concentration of resin on the outer surface and a relatively low resin concentration in the body, and a relatively high resin concentration at the line of junction with the plywood panel—the latter being provided for by the preliminary treating of the panel, as described above.

When the surface of the preliminarily compressed overlay is sprayed with resin, as just described, more mold lubricant should be used, to prevent the material from sticking to the platen of the hot press. The lubricant is preferably applied directly to the platen, but in some cases may be incorporated in the coating. The silicone material known as "Mold Release," sold by Dow Corning Company is satisfactory.

The final pressing operation may be performed in a mulitple opening, steam heated hot press 18 of the type commonly employed in the plywood industry in the manufacture of plywood panels having synthetic resin glue lines. The panels are loaded into the press openings in the usual manner and are pressed for substantially three minutes at substantially 175 lbs. per square inch, with the press platens at about 360° F. At the end of this time, the pressure is gradually released throughout a period of substantially 1½ minutes, when the press may be opened. This gradual release of pressure permits any internal expanding gases to escape from the layer of overlay, without any danger of disruption thereof. The overlay material is quite porous and includes a great multiplicity of minute openings, between the various wood particles. As the pressure is decreased, the gases created during the setting of the resin find their way through these pores or openings to the surface, and readily escape as the pressure approaches zero and while the platen is still in contact with the outer surface of the overlay.

Thus, the entire pressing cycle in the final pressing operation may be maintained as low as substantially three minutes, depending on the thickness of the overlay and the temperatures and pressures employed.

After the panels are removed from the hot press, the moisture content of the plywood portion is often unduly low, because of the extra pressing operation to which it has been subjected. Hence, it is desirable to condition the panels. This conditioning operation may be readily accomplished by subjecting the individual panels to currents of moist air for a suitable period of time to permit the plywood to absorb sufficient moisture to bring its content up to a desired moisture content, as 5%–8%. The panels may be stood vertically on end, in spaced apart relation between suitable partitions 21, and air of relatively high moisture content circulated upwardly over their surfaces, as indicated by the arrows in Figure 3 to effect the desired increase in moisture content.

It has been found that a plywood panel may be effectively coated with an overlay in accordance with the present invention and as described above, on one surface only, without any trouble from warping, bending or cupping under variations in the moisture content of the panel, such as occur when the panel is later subject to ordinary variations in the humidity of the surrounding admosphere. Plywood having my overlay on one face only has the same characteristics, so far as warping, etc., as the plywood itself. This ability to provide the overlay on one surface only of the panel is an advantage of major commercial importance, since, in many uses of plywood panels, only one face is exposed, and the appearance of the back face is a matter of complete indifference.

With plywood overlay materials in accordance with the prior art, it has been impossible, commercially, to produce panels having the overlay on only on surface, because of the resulting warping, cupping or other distortions in shape. For instance, with resin impregnated paper sheet overlays or the like, manufacturers have been forced, in the commercial art, to apply the paper sheets or other fibrous webs to both faces of the panels, to prevent warping and bending thereof, irrespective of the use to which the panels were to be put, and in spite of the additional cost of providing the extra overlay.

Although the technical explanation for these phenomena is not clearly understood, it is thought that the relatively high tensile strength and the impervious character of the impregnated paper overlay materials give to these materials very different expansion and contraction characteristics, under changes in moisture content than the veneer plies. Hence, the non-covered face of the plywood panel may absorb and give up moisture more rapidly than the covered face, with a resulting difference in expansion and contraction on the two faces of the panel. Moreover, even if all of the wood plies absorb the same amount of moisture and tend to expand equally, the impregnated paper overlay, bonded to one surface, has such a tensile strength that the latter surface and the wood bonded to it cannot expand with the balance of the wood, and the panel warps and curves badly upon changes in moisture content.

With an overlay produced in accordance with the present invention, however, the layer of discrete wood particles and synthetic resin is quite porous and has a low tensile strength. Hence, moisture can permeate through the overlay so that both faces of the panel absorb and give up moisture at substantially the same rate. Apparently, the wood particles in the overlay itself absorb and give up moisture so that they expand and contract with the plywood part of the composite panel. Also, since the wood particles in the overlay are not interlaced, entwined and felted together, as in the case with the fibers in paper-like sheets or fibrous webs, they are not sufficiently interlocked to prevent slight movements between the fibers and equal expansion and contraction of both faces of the plywood panel. The overlay of the present invention does not have sufficient tensile strength to resist the tendency of the adjacent surface of the panel to expand or contract. Hence, the panel remains flat under all conditions, even though only one face is covered with the overlay material. The lack of tensile strength in the overlay is not a disadvantage, since the wood plies supply all strength needed and the overlay is provided for different purposes.

Although the present invention has been described with particular reference to applying overlay materials to plywood panels, it must be understood that it is not limited thereto, as the novel procedures are of utility in applying overlays to other types of wood products, such as conventional lumber, as individual pieces or assembled into larger sheets or panels. Thus, the novel steps of coating the surface of the wood product with a thin coating of synthetic resin, applying the overlay to the coated surface, preliminarily compressing the overlay, applying a surface coating of resin to the preliminarily compressed mixture, and finally compressing the overlay under sufficient heat and pressure to convert the resin, may be employed for other purposes than providing an improved overlay on plywood.

I claim:

1. The method of making a wood product having an overlay thereon, which comprises applying to the surface of a wood sheet, a smooth, even layer of substantial thickness of a mixture of discrete wood particles and an aqueous synthetic resin solution, preliminarily compressing the layer under heat of at least substantially 250° F. and under pressure of at least substantially 30 pounds per square inch, for at least 5 seconds and completely releasing said preliminary compressing, thereby compacting the mixture sufficiently to prevent accidental disturbance of the layer during subsequent handling, and subsequently subjecting the wood sheet and the layer to greater heat and pressure for a longer time to compact the layer and to convert the resin to the insoluble, infusible state and to bond the wood particles to each other and the layer as a whole to the surface of the wood sheet.

2. The method of making a wood product having an overlay thereon, which comprises applying to the surface of a wood sheet, a smooth, even layer of substantial thickness of a mixture of discrete wood particles and an aqueous synthetic resin solution, preliminarily compressing the layer under heat of at least substantially 250° F. and under pressure of at least substantially 30 pounds per square inch, for at least 5 seconds to compact the mixture and to prevent accidental disturbance of the layer during subsequent handling, completely releasing said preliminary compression and the application of heat, subsequently subjecting the wood sheet and the layer to greater heat and final pressure for a longer time to compact the layer and to convert the resin to the insoluble, infusible state and to bond the wood particles to each other and the layer as a whole to the surface of the wood sheet, and gradually reducing the final pressure, to permit the gradual escape of steam from the layer before entirely releasing the final pressure.

3. The method of making a plywood product having an overlay thereon, which comprises applying to at least one surface of the panel a thin coating of an aqueous synthetic resin solution, applying to the coated surface of the panel a smooth even layer of substantial thickness of a relatively dry mixture of discrete wood particles and an aqueous synthetic resin solution which is similar to and compatible with the resin of said coating, preliminarily compressing the layer under heat and pressure, completely releasing the preliminary application of pressure and heat after sufficient time and temperature to compact the mixture sufficiently to prevent accidental disturbance of the layer during subsequent handling of the panel, and subsequently subjecting the panel and the layer to greater heat and pressure for a longer time to convert the resins to substantially the insoluble, infusible state and to bond the wood particles to each other and the layer as a whole to the surface of the panel.

4. The method of making a plywood product having an overlay thereon, which comprises applying to the surface of the panel a smooth, even layer of substantial thickness of a mixture of discrete wood particles and an aqueous synthetic resin solution, preliminarily compressing the layer under heat and pressure, completely releasing the preliminary application of pressure and heat after sufficient time and temperature to compact the mixture sufficiently to prevent accidental disturbance of the layer during handling and to provide a substantially smooth, continuous, uniform upper surface on the layer, applying to the upper surface of the preliminarily compressed layer, a coating of an aqueous solution of a synthetic resin similar to the resin in said mixture and thereafter subjecting the panel, the layer and the coating to greater heat and pressure for a longer time to convert the resins to substantially the insoluble, infusible state and to bond the wood particles to each other and the layer as a whole to the surface of the panel.

5. The method of making a plywood product having an overlay thereon, which comprises applying to a surface of the panel a thin coating of an aqueous synthetic resin solution, applying to the coated surface of the panel a smooth, even layer of substantial thickness of a mixture of discrete wood particles and an aqueous synthetic resin solution which is similar to and compatible with the resin of said coating, preliminarily compressing the layer under heat and pressure, completely releasing the preliminary application of pressure and heat after sufficient time and temperature to compact the mixture sufficiently to prevent accidental disturbance of the layer during subsequent handling, applying onto the surface of the preliminarily compressed layer a coating of an aqueous solution of a synthetic resin similar to the resin used in the mixture, and thereafter subjecting the panel, the layer and said coating to greater heat and pressure for a longer time to convert the resin to substantially the insoluble, infusible state and to bond the wood particles to each other and the layer as a whole to the surface of the panel.

6. The method of making a plywood product having an overlay thereon, which comprises applying to the surface of the panel a smooth, even layer of substantial thickness of a mixture of discrete wood particles and an aqueous synthetic resin solution, preliminarily compressing the layer on the panel for from 5 to 10 seconds at 250° to 300° F., to compact the mixture sufficiently to prevent accidental disturbance of the layer during subsequent handling, completely releasing said preliminary compressing, and subsequently subjecting the panel and the layer to final compression at substantially 175 lbs. per square inch for substantially 3 minutes at substantially 360° F.

7. The method of making a plywood product having an overlay thereon, which comprises applying to the surface of the panel a smooth, even layer of substantial thickness of a mixture of discrete wood particles and an aqueous synthetic resin solution, preliminarily compressing the layer on the panel for from 5 to 10 seconds at 250° to 300° F., to compact the mixture sufficiently to prevent accidental disturbance of the layer during subsequent handling, completely releasing said preliminary compressing, subsequently subjecting the panel and the layer to final compression at substantially 175 lbs. per square inch for substantially 3 minutes at substantially 360° F., and gradually releasing the final pressure throughout a period of substantially 1½ minutes to permit the gradual escape of steam from the layer before the final pressure is completely released.

8. A method in accordance with claim 6 in which the preliminary compression of the layer is effected by simultaneously applying rolling pressure and heat to the layer.

9. A method in accordance with claim 6 in which a plurality of panels are collected in a stack, after the preliminary compressing step, and in which the subsequent heat and pressure is applied simultaneously to said plurality of panels in a hot press.

10. A method in accordance with claim 6 in which a plurality of panels, after the preliminary compressing of the layers thereon, are collected in a press loader, and in which said panels are subsequently loaded simultaneously into a hot press for the subsequent heating and pressing step.

11. A method in accordance with claim 6 characterized in that the panels, after the final heating and pressing step are subjected to currents of moist air to condition the panels and to raise the moisture content thereof to 5% to 8%.

ARTHUR R. WELCH.

REFERENCES CITED

The following references are of record in the file of this patent:

UNITED STATES PATENTS

| Number | Name | Date |
| --- | --- | --- |
| 1,160,362 | Baekeland | Nov. 16, 1915 |
| 1,763,653 | Harvey et al. | June 17, 1930 |
| 2,077,714 | Rozema | Apr. 20, 1937 |
| 2,215,244 | Linzell | Sept. 17, 1940 |
| 2,290,548 | Galber | July 21, 1942 |
| 2,343,740 | Birmingham | Mar. 7, 1944 |
| 2,354,090 | Stamm et al. | July 18, 1944 |
| 2,412,534 | Randall | Dec. 10, 1946 |
| 2,419,614 | Welch | Apr. 29, 1947 |

FOREIGN PATENTS

| Number | Country | Date |
| --- | --- | --- |
| 486,619 | Great Britain | June 8, 1938 |